US006587264B2

(12) United States Patent
Knapp

(10) Patent No.: US 6,587,264 B2
(45) Date of Patent: Jul. 1, 2003

(54) SELECTIVELY TUNED ULTRAVIOLET OPTICAL FILTERS AND METHODS OF USE THEREOF

(75) Inventor: Jamie Knapp, Mendon, MA (US)

(73) Assignee: Thermo Corion Corporation, Franklin, MA (US)

( * ) Notice: Subject to any disclaimer, the term of this patent is extended or adjusted under 35 U.S.C. 154(b) by 26 days.

(21) Appl. No.: 09/764,676

(22) Filed: Jan. 18, 2001

(65) Prior Publication Data

US 2002/0093732 A1 Jul. 18, 2002

(51) Int. Cl.[7] .............................. G02B 5/20; F21V 9/06
(52) U.S. Cl. ...................... 359/361; 359/360; 359/308; 359/309; 359/586
(58) Field of Search ................................. 359/361, 370, 359/308, 309, 586, 587, 588, 589, 577, 580

(56) References Cited

U.S. PATENT DOCUMENTS

| 4,621,889 A | * | 11/1986 | Chikano et al. ............. 359/359 |
| 4,690,526 A | * | 9/1987 | Ledebuhr ..................... 349/25 |
| 4,692,690 A | * | 9/1987 | Hara et al. ................ 324/158.1 |
| 4,826,311 A | * | 5/1989 | Ledebuhr ........................ 349/9 |
| 5,501,926 A | * | 3/1996 | Cheng et al. ................ 430/323 |
| 5,635,332 A | * | 6/1997 | Nakano et al. .......... 430/270.1 |
| 6,157,503 A | * | 12/2000 | Knapp ........................ 359/361 |

* cited by examiner

Primary Examiner—Mohammad Sikder
(74) Attorney, Agent, or Firm—Peter F. Corless; Christine C. O'Day; Edwards & Angell, LLP

(57) ABSTRACT

A novel, cost effective optical filter is employed for photosensors used in ultraviolet-based water purification systems. Optically tuned to specifically eliminate the non-germicidal wavelength polychromatic emissions from mercury lamps, this unique optical filter approach significantly reduces the cost in manufacturing reliable water purification systems employing ultraviolet light.

9 Claims, 11 Drawing Sheets

Center Wavelength: 253.7nm +/- 4nm
HBW: 25nm +/- 5nm
%T(peak) = 12% - 20%
Out Of Band Wavelength Rejection: </= 0.01% X-Ray to Far IR
Sizes: Typically 7mm DIA or larger
Thickness: Typically 2mm - 7.6mm
Typical Price: $88

Center Wavelength: 300nm nominal
%T = 20% - 50% at 254nm
Wavelength Rejection: </= 0.1% 360nm - far IR
Sizes: Typically 7mm DIA or larger
Thickness: Typically 5mm - 6.5mm
Typical Price: $250

SELECTIVELY TUNED ULTRAVIOLET OPTICAL FILTERS AND METHODS OF USE THEREOF

FIELD OF THE INVENTION

The present invention relates to improved cost-effective ultraviolet optical filtering devices. More particularly, the present invention relates to selectively tuned ultraviolet optical filters useful in mercury vapor lamp based UV water purification systems.

BACKGROUND OF THE INVENTION

Purified water is essential not only for drinking purposes, but also for numerous other applications such as, for example, drug and food manufacturing, semiconductor processing, critical cleaning applications, heat exchanger coolant use, purification of swimming pool water, etc.

Of particular concern in the water purification industry is that of providing purified drinking water to third world countries. Significant challenges continue to exist in this area due to the need for a high degree of purification and utmost reliability required to prevent water-borne diseases (cholera, typhoid, hepatitis, etc.). In addition, such water purification treatment processes must have the capacity to produce high volumes of purified water at the lowest possible cost.

Chemical, biological and physical treatment processes are well-known and are capable of providing water of varying degrees of purity. One popular process though is the exposure of germ-laden water to the germicidal wavelength of an ultraviolet source. Exposing flowing water to the ultraviolet germicidal wavelengths of 200–300 nm alters and damages a bacteria's DNA, thereby preventing its reproduction. DNA absorbs ultraviolet light strongly in the ultraviolet spectrum centered at 260 nm. Thus, the typical dominant 254 nm emission of a mercury vapor lamp has been employed for this purpose.

The U.S. Public Health Service requires that ultraviolet water purification equipment have a minimum 254 nm ultraviolet dosage of 16,000 micro-watt-seconds per square centimeter. In order to insure that this minimum criteria is satisfied, an ultraviolet mercury lamp is often monitored with an optically filtered silicon photosensor (which directly measures the 254 nm emission). If the silicon photosensor measures a low 254 nm emission, a warning is activated to replace the substandard ultraviolet lamp. Determining when an ultraviolet mercury lamp has aged to the point where its germicidal effectiveness is diminished is critical.

Some existing expensive UV water purification systems are in use which employ ultraviolet enhanced photodiodes fitted with standard optical bandpass filters to monitor the life of the mercury lamp. These optical bandpass filters define the performance of the optical system by selecting the critical 254 nm emission, while optically blocking the remaining full UV/VIS/IR spectral region (200 nm to 1200 nm). Although successful in their application, such standard optical filters are very expensive, are limited in their 254 nm performance, and have substandard durability which limits their longevity, field lifetime and versatility. Further, these optical bandpass filters have poor resistance to environmental exposure (e.g. moisture and temperature) and, thus, need to be very carefully hermetically sealed within the housing of the photosensor. Thus, such optical filters are not suitable in applications, such as water purification in third world countries, which require utmost reliability at the lowest possible cost.

Presently available optical filters used in water purification systems are expensive standard narrow bandpass filters centered at 254 nm. The two general types are: MDM (Metal-Dielectric-Metal) filters and Solar Blind Filters. MDM filters consist of transparent quartz (or similar) substrates optically coated with alternating thin films of a soft dielectric (e.g. cryolite) and metallic aluminum. Disadvantages of MDM filters include: poor resistance to elevated temperature, extreme fragility (soft, easily scratched optical coatings limits their use) which requires the coatings to be protected with additional quartz substrates, thickness and size constraints and extreme cost (approximately $88 per filter). Shown in FIG. 4 is the spectral behavior of a typical 254 nm MDM bandpass filter. Solar Blind Filters are multi-element devices manufactured with absorptive glasses and optical crystals (e.g. nickel sulfate). Such filters are very sensitive to moisture and heat, are very thick (5–6 mm) and cost prohibitive (approximately $250 per filter). Shown in FIG. 5 is the spectral behavior of a standard Solar Blind Filter. Both MDM and Solar Blind Filters are limited in their application because they must be mounted and sealed within a photodiode housing. Because of manufacturability, the filter sizes must be large and cover the full clear aperture of the photodiode housing (see FIG. 3).

It would, thus, be desirable to provide improved optical filters for ultraviolet water purification systems that are capable of producing large volumes of highly purified water with utmost reliability and at the lowest possible cost.

SUMMARY OF THE INVENTION

The present invention provides an improved method and apparatus for the ultraviolet purification of liquids, particularly water, at a substantially lower cost and greater reliability than currently available systems. More particularly, the present invention provides unique ultraviolet optical filters selectively tuned to eliminate the discrete non-germicidal wavelength polychromatic background emissions from mercury lamps.

In addition to the typical 254 nm emission of a mercury lamp, mercury lamps also have polychromatic background emissions at other discrete wavelengths, e.g., 313 nm, 365 nm, 405 nm, 436 nm, 546 nm, 579 nm, 1015 nm and 1140 nm (see FIG. 2). This is a unique characteristic of these types of lamps. These wavelengths do not contribute to water purification, but do interfere with the accurate optical monitoring of the mercury lamp life using a silicon photodiode. To monitor the critical 254 nm mercury lamp emission, these wavelengths must be blocked. Whereas standard expensive MDM or Solar Blind 254 nm bandpass filters fully block the entire UV/VIS/IR spectral regions, it is the unique and novel feature of this invention to block only these discrete background wavelengths. In this way, the optical filter cost is dramatically reduced and the reliability improved.

The optical filters of the present invention provide a number of advantages over prior optical filters including, for example, very low cost (less than $2 as opposed to $88 for MDM filters and $250 for Solar Blind Filters), extreme durability to high temperatures and moisture, superior scratch resistance, small sizes, improved optical performance, extended physical longevity, high imaging quality of transmitted radiation, and improved throughput of the transmitted critical 254 nm wavelength. Further, preferred filters of the invention do not require any sealing from the ambient atmosphere and do not degrade over time with exposure to ultraviolet irradiation.

The optical filters of the present invention may be fabricated by conventional optical coating technologies including, for example, physical vapor deposition (thermal evaporation employing electron-beam technology), ion assisted deposition, ion beam or magnetron sputtering, chemical vapor deposition or reactive ion plating.

The design and dimensions of the optical filters in accordance with the present invention makes them particularly suitable for use in water purification systems that employ ultraviolet enhanced photodiodes fitted with optical filters. In one preferred embodiment, the optical filters of the present invention comprise a substrate having optical coatings thereon. Such optical filters may suitably form the external window of the photodiode. In a particularly preferred embodiment, optical coatings are directly deposited upon the photodiode surface itself, which provides particularly substantial cost savings (FIG. 1).

In accordance with one embodiment of the present invention, the optical filter comprises a substrate with optical coatings deposited on one or both surfaces of the substrate. The substrate may be selected from a wide variety of conventional optical substrates including, for example, glass, plastic, fused silica, metal or the like. In preferred embodiments, the substrate is either a single thin fused silica substrate or an ultraviolet transparent glass substrate.

The coating material of the present invention may be a variety of materials recognized by those skilled in the art including low and high refractive index materials. Low refractive index ($n_L$) materials include, for example, $SiO_2$, $Al_2O_3$, SiO, fluorides such as barium fluoride and lanthanum fluoride, MgO, etc. Collectively, low-index materials are sometimes referred to herein as "L". Low-index materials (L) are defined to mean herein materials having a refractive index (20/D) of less than 2.0, more typically 1.8 or less such as 1.8 to 1.3. Common high refractive index ($n_H$) materials include, for example, $TiO_2$, $ZrO_2$, $Ta_2O_5$, and $HfO_2$. Collectively, these high-index materials are sometimes referred to herein as "H". High-index materials (H) are defined to mean herein materials having a refractive index (20/D) of 2.0 or greater. As known to those skilled in the art, the designation "20/D" indicates the refractive index values are as measured at 20° C. using a light source of the D line of sodium. In particularly preferred embodiments, the coating materials are thin films of ultraviolet transparent refractory metal oxide (e.g. hafnium oxide, zirconium oxide, silicon dioxide, etc.).

In some embodiments, rather than form the optical coatings on the above-described substrate materials, the optical coatings may, if desired, be coated directly upon the photodiode active area.

The spectral design of the optical filter is tuned specifically in accordance with its ultimate use. For ultraviolet water purification, the optical filter transmits effectively within the wavelengths that contribute to ultraviolet sterilization (centered at 254 nm) and selectively rejects those background discrete wavelengths in the UV/VIS/IR emission spectra of typical mercury lamps and which fall within the sensitivity region of photodiodes.

The specially tuned optical filters of the present invention, when used in connection with ultraviolet enhanced photodiodes, provide accurate low-cost monitoring of the critical 254 nm emission required in water purification procedures.

Other aspects of the invention are discussed infra.

DETAILED DESCRIPTION OF THE INVENTION

Figure 1:
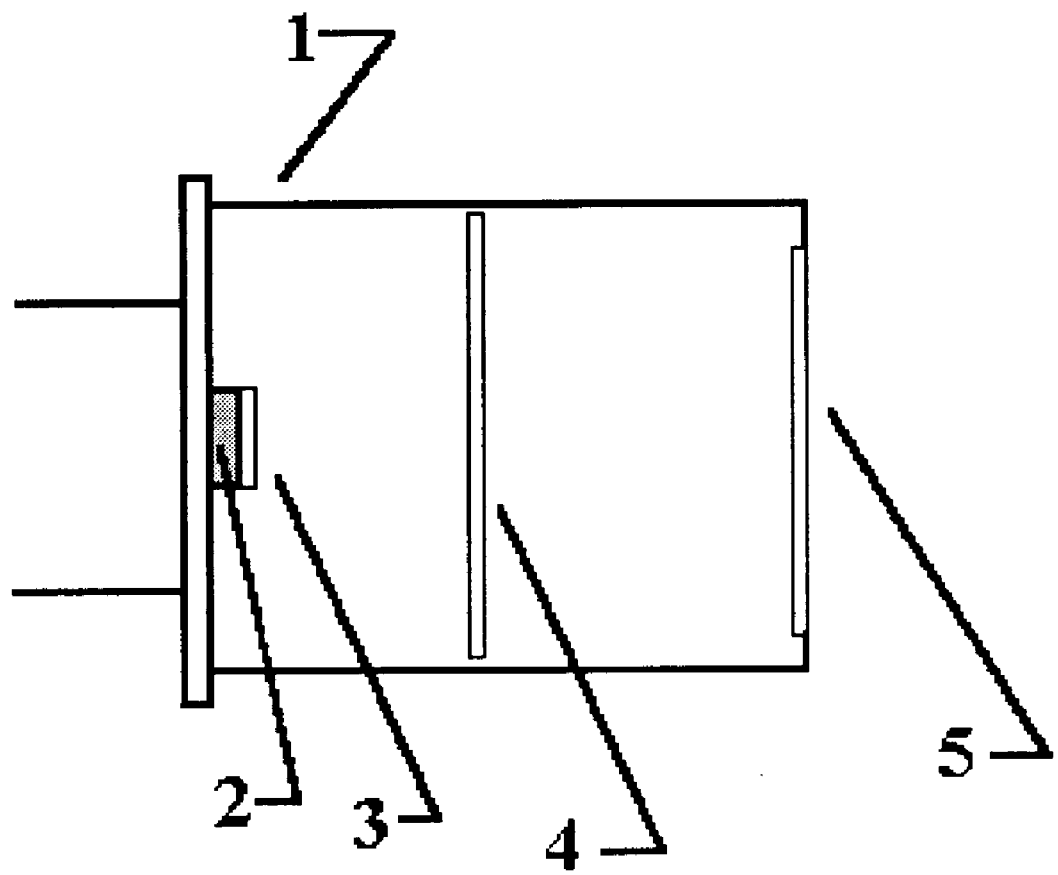
FIG. 1 is a simplified cross sectional view of one embodiment of the photodiode assembly in accordance with the present invention.
Figure 2:
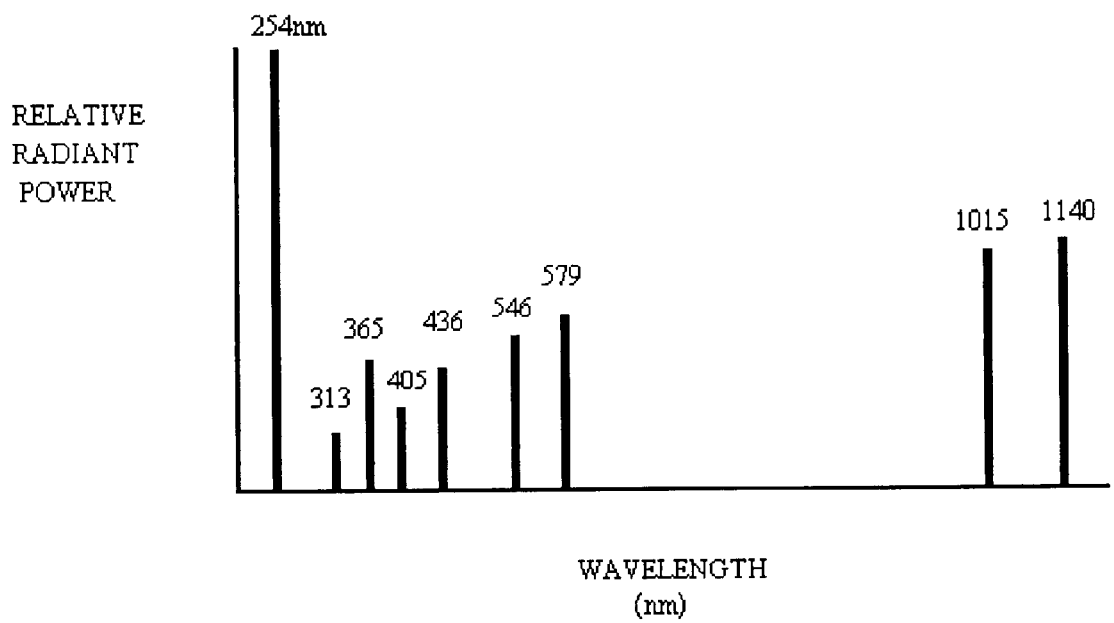
FIG. 2 depicts graphically the typical spectral emission from a mercury lamp.
Figure 3:
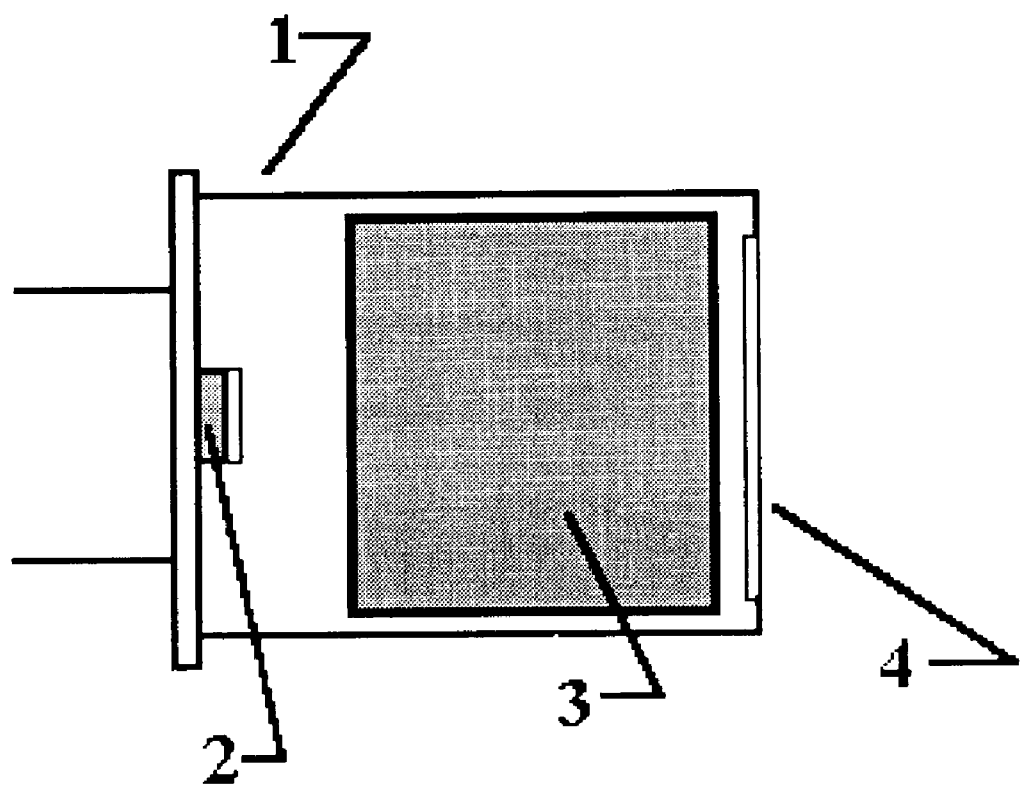
FIG. 3 is a simplified cross sectional view of a typical photodiode assembly employing current technology.
Figure 4:
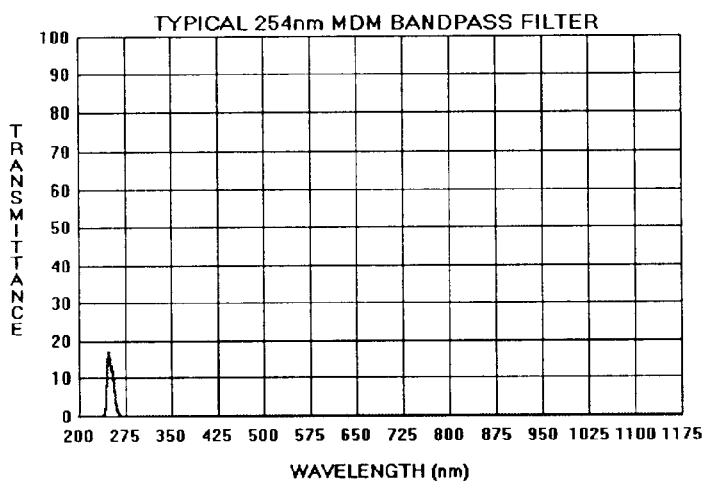
FIG. 4 depicts graphically the spectral behavior of a typical 254 nm MDM bandpass filter.
Figure 5:
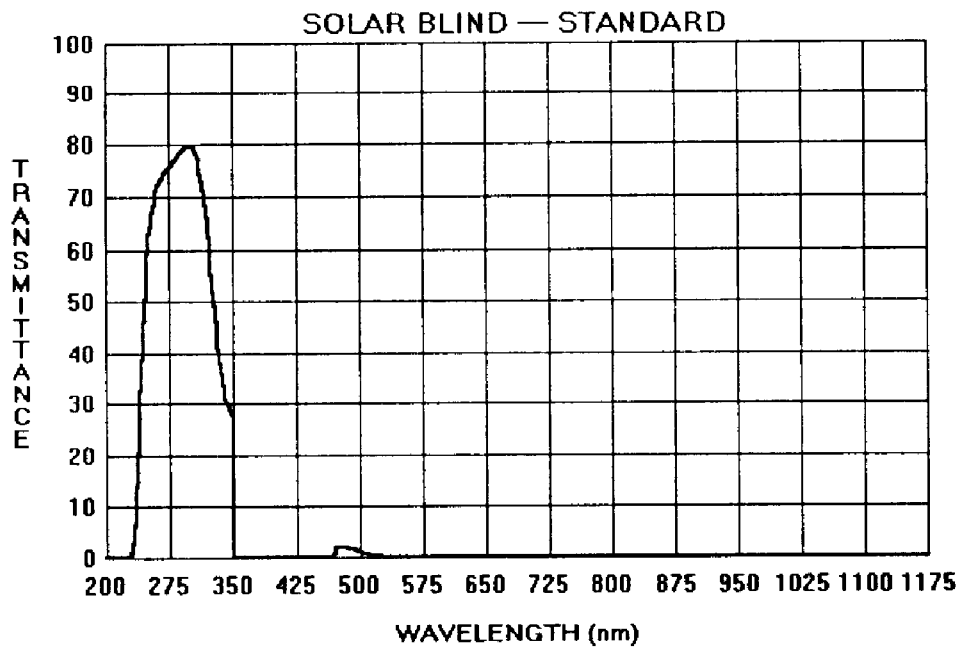
FIG. 5 depicts graphically the spectral behavior of a typical solar blind filter.
Figure 6:
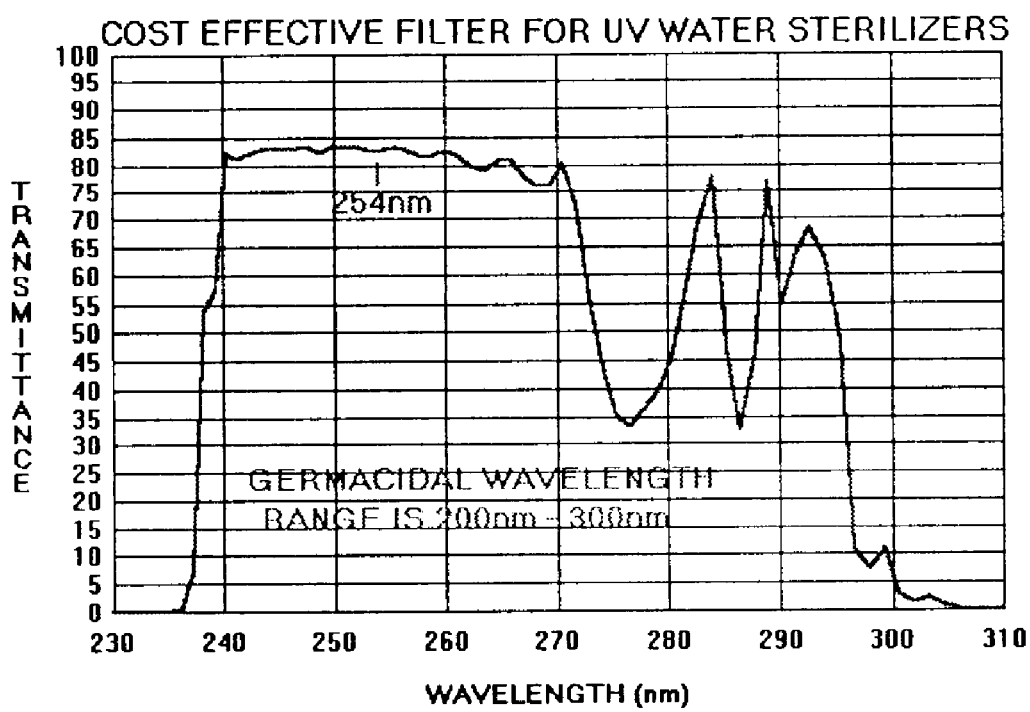
FIG. 6 depicts graphically the transmittance of the optical filter in accordance with the present invention.
Figure 7:
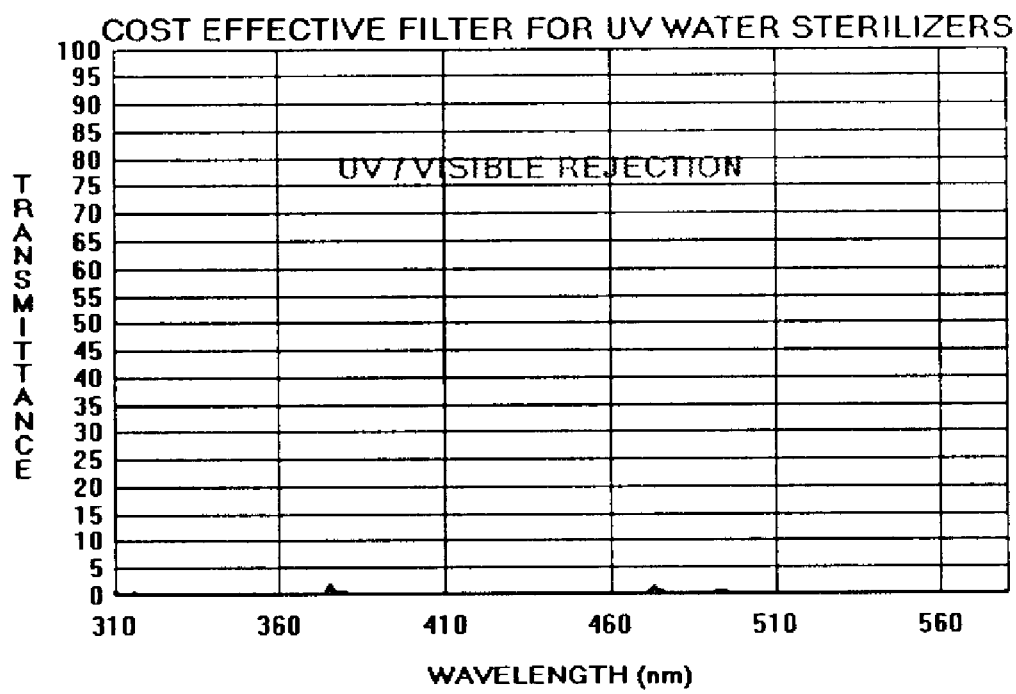
FIG. 7 depicts graphically the tuned ultraviolet and visible rejection of the optical filter in accordance with the present invention.
Figure 8:
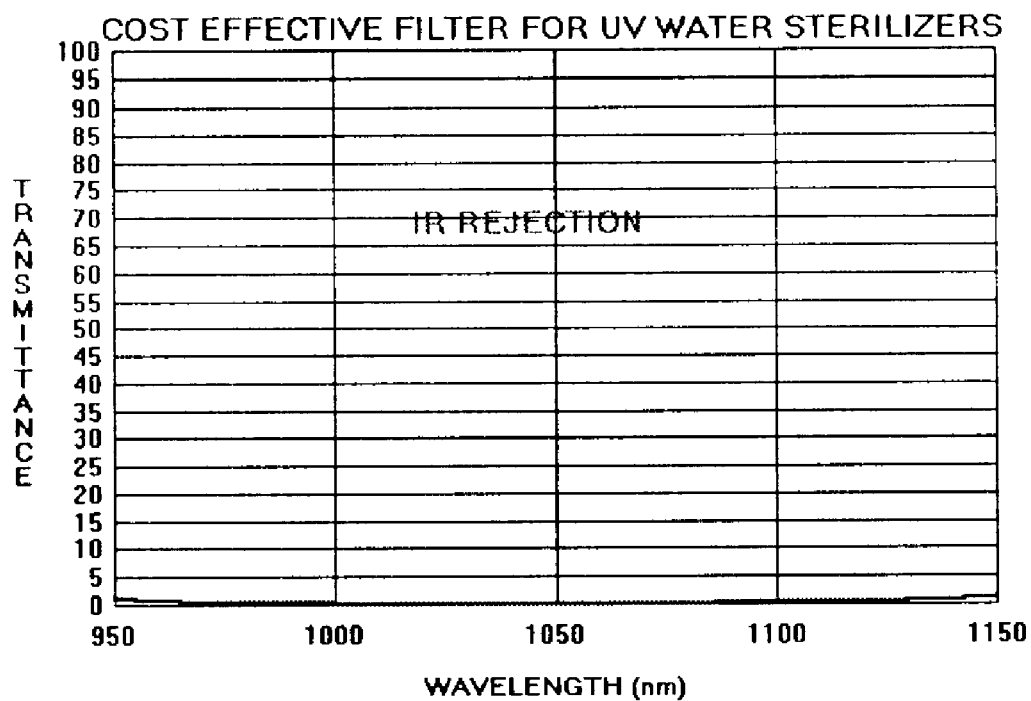
FIG. 8 depicts graphically the IR rejection of the optical filter in accordance with the present invention.

Referring now to the various figures of the drawing, wherein like reference characters refer to like parts, there is shown various views of the photosensor/optical filter assemblies used in ultraviolet-based water purification systems, optical filters and graphical performance data in accordance with the present invention.

FIG. 1 shows a simplified view of one embodiment of the spectrally tuned optical filter in accordance with the present invention. The filtered photosensor comprises a housing 1 (the photodiode "can"). Within the housing 1 is a standard ultraviolet enhanced photodiode 2, and one optical filter (3, 4 or 5). In one preferred embodiment, the optical filter 3 (consisting of optical coatings on a discrete UV transparent substrate) is mounted within the housing 1 directly onto the active area of the photodiode 2. In other embodiments, the optical filter 3 may be located in alternate mounting position 4. As a cost savings, the filter may uniquely also be used as the photodiode housing window 5 as shown in FIG. 1. Greater cost savings is obtained when the filter is of the smallest size (position 3). The greatest cost savings is obtained when the optical coatings are deposited directly upon the photodiode surface without the use of the discrete UV transparent substrate.

Figure 9:
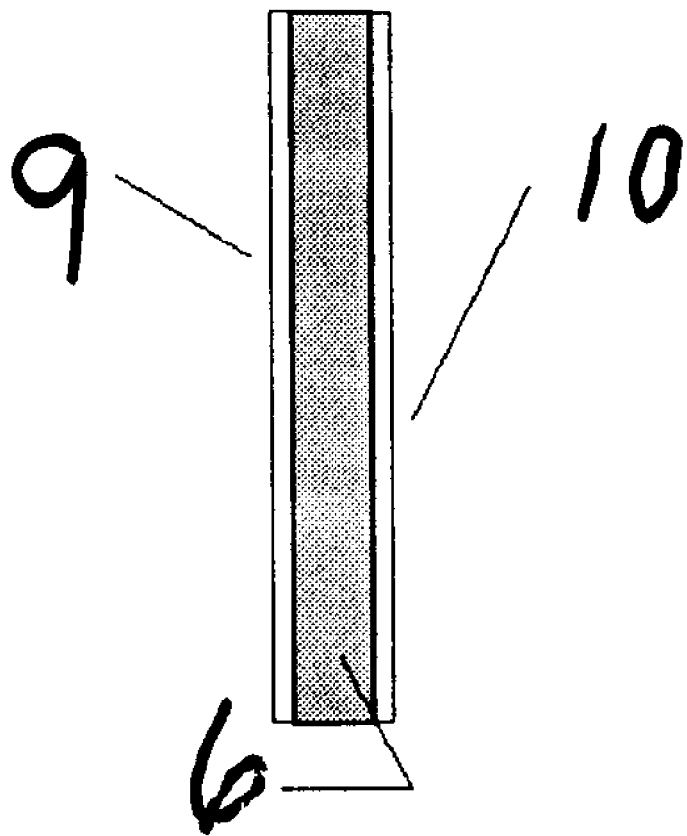
FIG. 9 shows a simplified cross sectional view of the optical filter coating design in accordance with one embodiment of the present invention.

As shown in greater detail in FIG. 9, in one embodiment, the optical filter 3 comprises a substrate 6 with one or more optical coating layers deposited thereon. The optical coating layers comprise a UV/VIS rejection coating 9. Optionally, an IR rejection coating 10 may also be necessary, based upon the responsivity of the photodiode 2 that is utilized. For example, IR rejection coatings 10 would generally not be required when IR wavelengths do not fall within the sensitivity region of the photodiode that is used. On the other hand, IR rejection coatings 10 should be used when IR wavelengths do fall within the sensitivity region of the photodiode that is used.

The substrate 6 may be selected from a wide variety of conventional optical substrates including glass, plastic, fused silica, metal or the like. The substrate 6 is preferably substantially transparent and thin. In preferred embodiments, the substrate 6 is either a single thin fused silica substrate or an ultraviolet transparent glass substrate.

Figure 10:
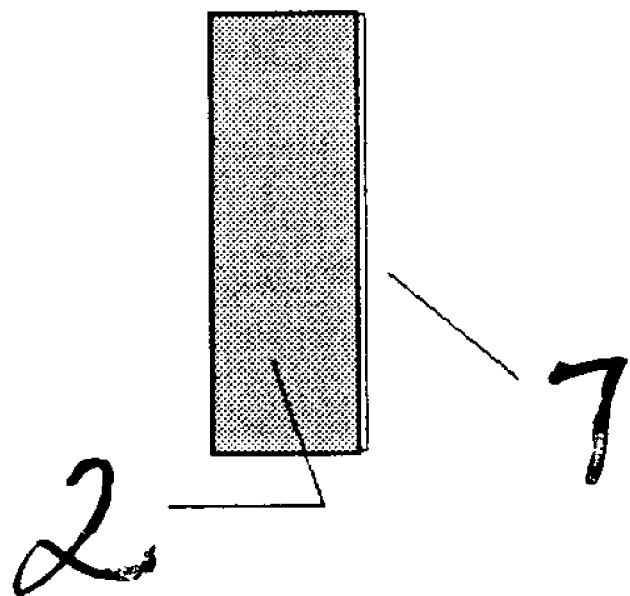
FIG. 10 shows a simplified cross sectional view of the optical filter coating design in accordance with a second embodiment of the present invention.

In a preferred embodiment, as shown in FIG. 10, the coating layers 7 may be directly deposited on the active surface of the ultraviolet enhanced photodiode 2 with the photodiode 2 acting as the substrate. Again, these optical coating layers 7 comprise a UV/VIS rejection coating 9 and, optionally, an IR rejection coating 10.

The optical coatings 9 and 10 may be either deposited on two sides of the substrate 6 or, alternatively, all on one side of this substrate 6. Likewise, the optical coating layers 7 may be may be either deposited on both sides of the ultraviolet enhanced photodiode 2 or, most preferably all on one side of this ultraviolet enhanced photodiode 2.

The optical coatings 7 may be fabricated of coating materials recognized by those skilled in the art including low and high refractive index materials. Low refractive index materials include, for example, $SiO_2$, $Al_2O_3$, SiO, fluorides such as barium fluoride and lanthanum fluoride, MgO, etc. Common high refractive index ($n_H$) materials include, for example, $TiO_2$, $ZrO_2$, $Ta_2O_5$, and $HfO_2$. In particularly preferred embodiments, the coating materials are thin films of ultraviolet transparent refractory metal oxide (e.g. hafnium oxide, zirconium oxide, silicon dioxide, etc.). In a particularly preferred embodiment, the optical filter comprises a multiplayer coating of alternating layers of hafnium oxide and silicon dioxide.

Various manufacturing processes may be employed to deposit the optical coating layers 7 including, for example: physical vapor deposition (thermal evaporation employing electron-beam technology), ion assisted deposition, sputtering, chemical vapor deposition or reactive ion plating.

Thicknesses of coating layers applied in accordance with the present invention will typically vary from tens of nms per layer to hundreds of nms per layer, depending on applications, as will be appreciated by those skilled in the art. The overall size of the optical filters of the present invention is preferably no greater than 2 mm² to enable direct mounting of the filters onto the photodiode active surface. In the event that the optical filters are used as the photodiode housing window, the optical filters are sized to correspond to the size of the photodiode housing window, which typically is approximately 6 mm in diameter. As the size of the photodiode housing window varies, the size of the optical filter varies accordingly. Preferred thicknesses of the optical filters range from about 0.5 mm to about 1 mm nominally.

The optical filters 3 of the present invention exhibit exceptional properties, particularly for use in ultraviolet water purification systems utilizing a mercury lamp. As discussed above, preferred optical filters 3 of the invention do not require any sealing from the ambient atmosphere (e.g. no epoxy or other encapsulation), do not degrade over time and exposure to UV irradiation, and offer superior transmittance at the critical 254 nm wavelength. Such filters are useful for a wide variety of applications, particularly where current technology bandpass filters are simply too expensive.

More specifically, preferred optical filters 3 of the invention include filters that have a 254 nm optical transmittance of at least about 40%, more preferably at least about 70%, still more preferably at least about 75% or 79%. Such transmittance is maintained over extended periods of exposure to ultraviolet radiation, e.g. exposure to radiation from a typical germicidal mercury vapor lamp at energy doses typically provided by the following: positioning a filter of the invention from about 0.25 inches to 0.5, 1, 2, 3, 4, 5, 6, 7, or 8 inches away from a germicidal mercury vapor lamp that may be 10, 20, 50, 100, 200, or 500 watts, for at least 100 minutes of exposure to such a lamp, more typically at least about 1000, 2000, 5000, 9000 or more hours of exposure to such a lamp. That is, preferred filters of the invention do not degrade under such extended exposure to ultraviolet light.

More specifically, preferred optical filters 3 of the present invention are tuned specifically for ultraviolet water purification, and, as such, the optical filters 3 transmit effectively within the wavelengths that contribute to ultraviolet sterilization (centered at 254 nm) and selectively reject those background discrete wavelengths in the UV/VIS/IR emission spectra of typical mercury lamps and which fall within the sensitivity region of photodiodes. More specifically, preferred optical filters 3 have an optical transmittance of at least about 40%, more preferably at least about 70%, still more preferably at least about 75% or 79% at a wavelength of about 254 nm. Further, preferred optical filters 3 of the present invention have an optical transmittance of no greater than 5% at wavelengths of 313 nm to 580 nm and 1000 nm to 1140 nm. Still further, preferred optical filters 3 of the present invention have an optical transmittance of no greater than 1% average within these wavelength regions. Still further, preferred optical filters 3 of the present invention have an optical transmittance of no greater than 2% absolute at wavelengths of 313 nm, 365 nm, 405 nm, 436 nm, 546 nm, 579 nm and 1015 nm.

The optical coating layers of the present invention exhibit excellent durability to harsh environmental conditions and excellent substrate adherence. More specifically, coatings applied by methods of the invention have withstood 100 or more cycles of high temperature and aggravated humidity per MIL-STD-810E (standard tests; military specification). Following such environmental exposure, the same coatings maintain excellent substrate adherence and pass the snap-cellophane test per MIL-C-48497 (standard test; military specification).

Ultraviolet-based water sterilizing systems utilizing optical filters of the present invention may be used to produce large volumes of highly purified water with utmost reliability and at such a low cost that its widespread use in third world nations may now be possible.

All documents mentioned herein are incorporated by reference herein in their entirety. The following non-limiting examples are illustrative of the invention (designs will vary depending upon the particular refractive indices of the coating materials and coating technologies employed). In the Examples, the optical coatings were deposited using ion plating deposition, by procedures disclosed in U.S. Pat. Nos. 6,139,968 and 5,753,319.

EXAMPLE 1

A multilayer optical filter having layers of hafnium oxide and silicon dioxide deposited on a synthetic fused silica substrate was fabricated as follows:

A. A UV/VIS rejection coating was deposited on one surface of the synthetic fused silica substrate as follows, (see also FIG. 9, reference number 9):

SUBSTRATE/0.30076H/0.12755L/(0.125L0.25H0.125L)10/
0.1216L/0.2857H/0.0904L/(0.163L0.325H0.163L)12/0.118L/
0.2954H/0.12159L/(0.2065L0.413H0.2065L)13/0.1542L/
0.2648H/0.52797L/AIR wherein:

Substrate: Synthetic Fused Silica (approximately 0.7 mm thick)

High Index Material (H): Hafnium Oxide

Low Index Material (L): Silicon Dioxide 0.25H=1 Quarter Wave Optical Thickness of Hafnium Oxide 0.25L=1 Quarter Wave Optical Thickness of Silicon Dioxide Design Wavelength=333 nm B. An IR rejection coating was then deposited on the opposite surface of the synthetic fused silica substrate as follows, (see also FIG. 9, reference number 10):

SUBSTRATE/0.749H/0.405L/(0.39156L0.8275H0.39156L)9/
0.3858L/0.80726H/0.2052L/AIR wherein:

Substrate: Synthetic Fused Silica (approximately 0.7 mm thick)

High Index Material (H): Hafnium Oxide

Low Index Material (L): Silicon Dioxide 0.25H=1 Quarter Wave Optical Thickness of Hafnium Oxide 0.25L=1 Quarter Wave Optical Thickness of Silicon Dioxide Design Wavelength=343 nm The filter was produced by the ion plating deposition of hafnium oxide and silicon dioxide onto 2.0" square synthetic fused silica substrates. The thickness of the synthetic fused silica substrate was approximately 0.7 mm.

Thicknesses of the halfnium oxide layers and of the silicon dioxide layers were as shown above. After dicing, the overall size of the optical filter was approximately 2 mm×2 mm SQ. Other sizes produced included 0.240" diameters.

Figure 11:
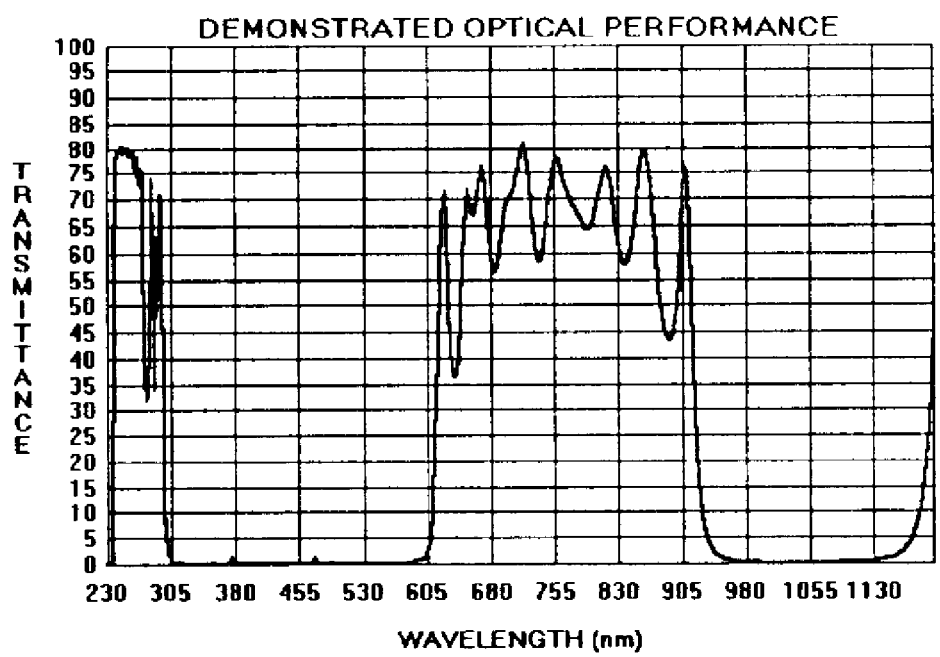
FIG. 11 depicts graphically the optical performance of the optical filter in accordance with the present invention.

The measured performance of the thus formed multilayer optical filter was tested with the following results, as graphically shown in FIG. 11. The measured %T at 254 nm is 79.4%. Further, the %T at the following wavelengths are as follows: %T=0.123% AVG (310 nm–580 nm); %T=0.23% AVG (1000 nm–1140 nm); %T=0.28% at 313 nm; %T=0.18% at 365 nm; %T=0.02% at 405 nm; %T=0.003% at 436 nm; %T=0.035% at 546 nm; %T=0.56% at 579 nm; %T=0.175 at 1015 nm.

The foregoing description of the invention is merely illustrative thereof, and it should be understood that variations and modifications can be affected without departing from the scope or spirit of the invention as set forth in the following claims.

What is claimed is:

1. An ultraviolet optical filter comprising:

at least one substrate having a first surface and a second surface; and at least one coating deposited on at least one surface of the substrate, wherein the ultraviolet optical filter has an optical transmittance of at least about 40% at a wavelength of 254 nm and optical transmittance of no greater than 5% for wavelengths of 313 nm, 365 nm, 405 nm, 436 nm, 546 nm, 579 nm, 1015 nm and 1140 nm.

2. The optical filter of claim 1, wherein the overall size of the optical filter is no greater than about 2 $mm^2$.

3. The optical filter of claim 1, wherein the substrate is selected from the group consisting of glass, plastic, fused silica and metal.

4. The optical filter of claim 3, wherein the substrate is fused silica.

5. The optical filter of claim 3, wherein the substrate is an ultraviolet transparent glass.

6. The optical filter of claim 1, wherein the substrate is a photodiode.

7. The optical filter of claim 1, wherein the optical coating layer comprises one or more layers selected from $SiO_2$, $Al_2O_3$, SiO, fluorides such as barium fluoride and lanthanum fluoride, MgO, $TiO_2$, $ZrO_2$, $Ta_2O_5$, and $HfO_2$.

8. The optical filter of claim 1, wherein the optical coating layer comprises at least one metal oxide layer.

9. The optical filter of claim 1, wherein the ultraviolet optical filter has an optical transmittance of no greater than 5% for discrete background UV/VIS/IR wavelengths typical of the emission spectra of a germicidal mercury vapor lamp.

* * * * *